United States Patent [19]

Isono et al.

[11] Patent Number: 5,801,740
[45] Date of Patent: Sep. 1, 1998

[54] IMAGE RECORDING APPARATUS CAPABLE OF ADJUSTING AN IMAGE RECORDING SPEED

[75] Inventors: Koichi Isono; Thouru Yonezawa, both of Hikone; Masamichi Cho, Kyoto, all of Japan

[73] Assignee: Dainippon Screen Mfg. Co., Ltd., Japan

[21] Appl. No.: 635,307

[22] Filed: Apr. 19, 1996

[30] Foreign Application Priority Data

Apr. 28, 1995 [JP] Japan .................... 7-106623

[51] Int. Cl.$^6$ .............. B41J 2/385; G03G 15/01; G03G 13/04
[52] U.S. Cl. ........................... 347/129; 347/261
[58] Field of Search ................ 347/237, 247, 347/129, 234, 261; 395/107; 358/296, 481, 462, 474, 300

[56] References Cited

U.S. PATENT DOCUMENTS

5,087,928  2/1992  Okino ........................... 347/234

*Primary Examiner*—N. Le
*Assistant Examiner*—L. Anderson
*Attorney, Agent, or Firm*—Ostrolenk, Faber, Gerb & Soffen LLP

[57] ABSTRACT

A first data rate detecting portion sends a first data transfer rate on a first interface, and a second data rate detecting portion sends a second data transfer rate on a second interface, respectively, to a CPU. The CPU compares the first and second data transfer rates and sets a connection state of a selector so that the image recording onto a photosensitive material is made at a high speed. The CPU also respectively determines the optimal rotation speeds of a polygon driving motor and a roller driving motor from the first or second data transfer rate, and rotates the polygon driving motor and the roller driving motor at the optimal rotation speeds. Then, when image data is inputted, an image is recorded on the photosensitive material.

25 Claims, 4 Drawing Sheets

IMAGE RECORDING APPARATUS CAPABLE OF ADJUSTING AN IMAGE RECORDING SPEED

BACKGROUND OF THE INVENTION

1. Field of the Invention

The present invention relates to an image recording apparatus, and more particularly to an image recording apparatus capable of adjusting an image recording speed.

2. Background of the Invention

A conventional image recording apparatus widely used in the fields of printing and prepress, industrial equipment, etc., switches on and off a laser beam according to digital image data inputted from an external device, such as an image scanner, a workstation, etc., and sequentially scans a recording medium having photosensitivity (hereinafter referred to as a photosensitive material) for each line with the laser beam to record an image on the photosensitive material transported in a sub-scanning direction. It is usually preferred that a transmission speed of the image data from the external device be equal to an image recording speed of the image recording apparatus. However, the comparison of the two shows that the latter is considerably faster in the present situation. Therefore, manufactures usually set the image recording speed of the image recording apparatus low so that it coincides with a data transfer rate of the external device before shipping to a user.

As has been described above, the image recording speed is fixed to a value suited to the data transfer rate of the external device in a conventional image recording apparatus, which cannot be changed readily by the user. Hence, even if the data transfer rate of the external device is increased by technical innovation etc., the image recording apparatus maintains the low image recording speed set by the manufacturer, which causes a problem since the original speed performance of the apparatus itself cannot be utilized sufficiently. If the image recording speed is reset by the manufacturer, it will cause another problem that operations of the image recording apparatus must be interrupted for a long time.

Furthermore, in the conventional image recording apparatus, if transmission of image data from the external device is interrupted due to some cause (processing interruption in the external device, for example) in the course of image drawing processing, then a sub-scanning feed of the photosensitive material is temporarily stopped to interrupt the drawing processing, and the photosensitive material is fed in the sub-scanning direction again to proceed with the drawing processing after the transmission of the image data is resumed. Thus, in the conventional image recording apparatus, as the photosensitive material is intermittently fed when the transmission of the image data is interrupted, a shift of a drawing position may occur in the sub-scanning direction. The shift of the drawing position will cause problems, such as streaks in the main scanning direction (the direction perpendicular to the sub-scanning direction), an extreme decrease in image dimension accuracy, or a bad influence on image quality. As countermeasures for these problems, highly accurate members have conventionally been used for a partial transporting of the photosensitive material or for the optical system to prevent the shift of the drawing position. Use of these highly accurate members, however, will result in complex processing and assembly of the members in the image recording apparatus, and increased cost.

SUMMARY OF THE INVENTION

It is an object of the present invention to provide an image recording apparatus which allows the free adjustment of an image recording speed according to a use environment.

It is another object of the present invention to provide an image recording apparatus which does not cause intermittent feed in the sub-scanning direction in the course of drawing.

The present invention is directed to an image recording apparatus for scanning a photosensitive recording medium with a light beam to record an image on the recording medium, which includes:

an electric-photo converting device converting inputted image data into a modulated light beam;

a reflection device reflecting the light beam;

a first driving force generating portion generating a driving force for displacing the reflection device to change an angle of incidence of the light beam thereby to scan the recording medium with the light beam in a main scanning direction;

a sub-scanning feed mechanism moving a main scanning position on the recording medium in a sub-scanning direction;

a second driving force generating portion generating a driving force for driving the sub-scanning feed mechanism; and a control portion determining an image recording speed onto the recording medium on the basis of an input rate of the image data to the electric-photo converting device and respectively controlling the driving forces generated by the first and second driving force generating portions according to the determined image recording speed.

As mentioned above, in this invention where the driving forces generated by the first and second driving force generating portions are controlled according to the input rate of the image data into the electric-photo converting device, if the input rate of the image data from the outside varies, then the image recording speed onto the recording medium can be varied accordingly. Hence, when the input rate of the image data from the external device is increased by future technical development, the image recording speed can be increased accordingly, which results in sufficient utilization of the original image recording speed of the image recording apparatus. Therefore, on the user's side, when an external device is exchanged for one with a higher speed, a work time required for drawing processing can be reduced. Furthermore, as there is no need to re-set the image recording speed by the manufacturer, etc., an operation stop time of the image recording apparatus can be minimized.

In a preferred embodiment of the present invention, the externally inputted image data is temporarily stored in the data storing portion. The control portion determines the image recording speed according to the transfer rate of the image data from the data storing portion to the electric-photo converting device.

Therefore, if the transfer rate of the image data from the data storing portion to the electric-photo converting device is increased, then the image recording speed onto the recording medium can also be increased accordingly.

It is preferred that the data storing portion has capacity for collectively storing image data corresponding to at least one page of the recording medium. This allows the image data corresponding to one page of the recording medium, required in the drawing processing, to be transferred from the data storing portion to the electric-photo converting portion without being intercepted, which allows the drawing process to be performed without temporarily stopping the sub-scanning feed of the recording medium, resulting in drawings with excellent image quality. Furthermore, since the image recording apparatus can be made without using highly accurate members, manufacturing cost can be reduced.

Also, another preferred data storing portion has a plurality of memories, thus when any one of the memories is outputting image data and there is additional image data to be recorded, the additional image data is stored in one of the other memories. This allows the individual image data stored in each memory to be continuously transferred to the electric-photo converting device, which reduces the work time required for the drawing process and allows the drawing process to be performed without temporarily stopping the sub-scanning feed of the recording medium, results in draws with excellent image quality.

Another preferred data storing portion is detachably provided. This allows the user to exchange the data storing portion for one having a higher data transfer rate in a minimum operation stop time. Accordingly, the image recording speed of the image recording apparatus can easily be increased as the data storing portion achieves a higher speed, which also reduces the work time required for the drawing process.

Another preferred embodiment has a route selecting portion for determining whether to store the image data in the data storing portion or not. The control portion includes an input operation portion for inputting by a manual operation a first transfer rate of the image data from the outside to the data storing portion and a rate storing portion for storing a second transfer rate of the image data from the data storing portion to the electric-photo converting device. The control portion compares the first transfer rate inputted by the input operation portion and the second transfer rate stored in the rate storing portion and disables the route selecting portion to store the image data in the data storing portion if the first transfer rate is higher, and enables said route selecting portion to store the image data in the data storing portion if the second transfer rate is higher. That is to say, the control portion selects a route with a higher image recording speed according to the transfer rates of the image data from the external device and the data storing portion. Therefore, if either one of the external device etc. and the data storing portion achieves a higher speed, then the image recording speed of the image recording apparatus is also automatically increased accordingly.

Still another preferred embodiment includes a route selecting portion adapted to enable and disable the image data to be stored in the data storing portion, a first data transfer rate detecting portion for detecting a transfer rate of the image data from the outside to the data storing portion, and a second data transfer rate detecting portion for detecting a transfer rate of the image data from the data storing portion to the electric-photo converting device. The control portion determines whether to store the image data in the data storing portion or not on the basis of the data transfer rates detected by the first and second data transfer rate detecting portions and sets the route selecting portion. Thus, the image recording apparatus improves efficiencies of the drawing processing to the recording medium.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
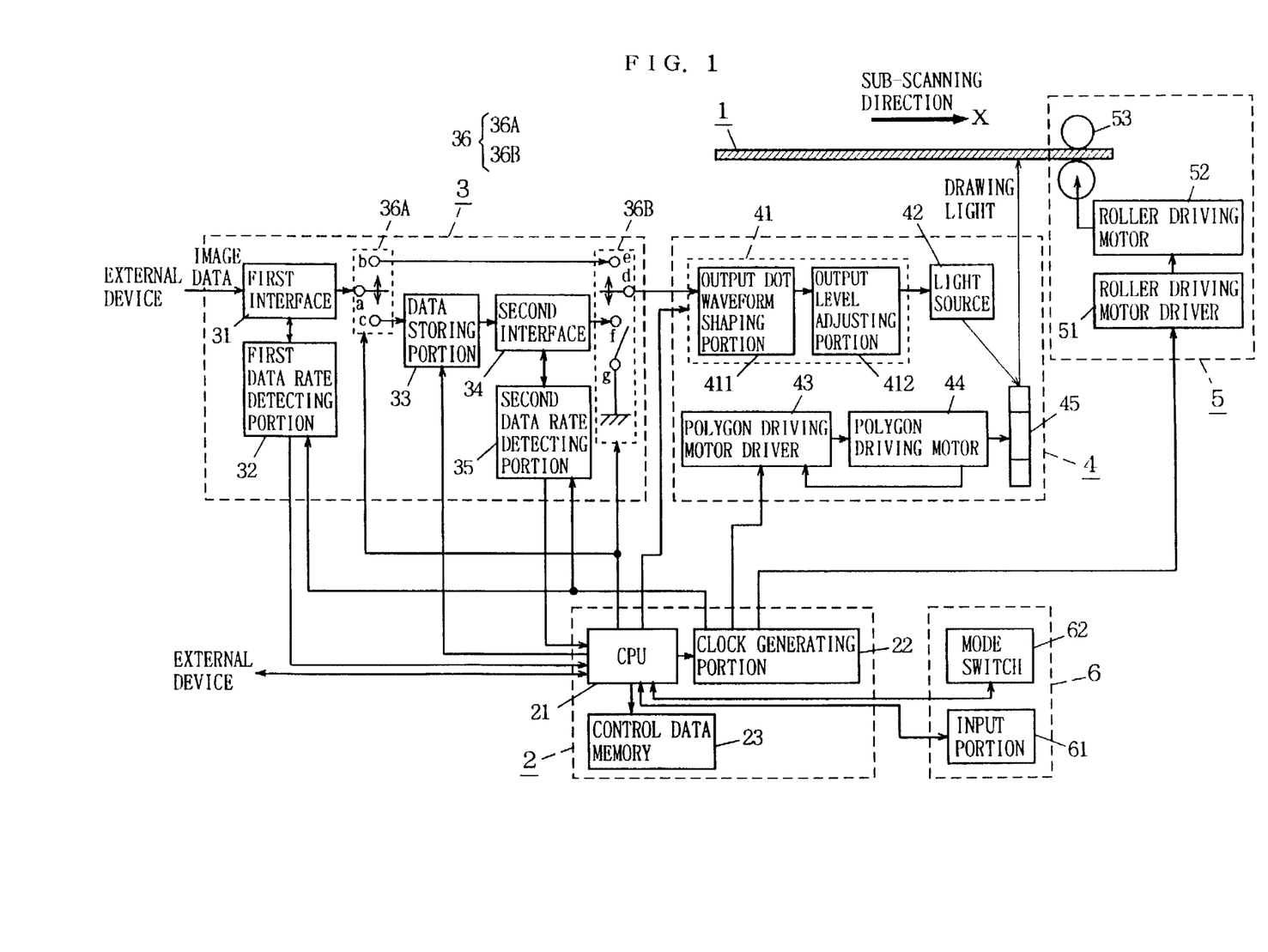
FIG. 1 is a block diagram showing the structure of an image recording apparatus according to an embodiment of the present invention.

FIG. 1 is a block diagram showing the structure of an image recording apparatus according to an embodiment of the present invention. In FIG. 1, the image recording apparatus of this embodiment includes a photosensitive material 1 as an example of a recording medium, a main control portion 2 as an example of control means, an image data input portion 3, an optical system 4, a photosensitive material transport portion 5 and an operation portion 6 as an example of input operation means. Structures of the respective parts of the image recording apparatus is subsequently described in detail.

As has been described above, the photosensitive material 1 has photosensitivity to a laser beam, etc. Usually, in a flat-bed scanning type image recording apparatus, the photosensitive material 1 has a standardized width (a width corresponding to such sizes as A2-size, A3-size as per Japanese Industrial Standard, etc.) and length, which is wound into a roll. The photosensitive material 1 is mounted on a photosensitive material mounting portion not shown. The photosensitive material mounting portion allows easy attachment and removal of the photosensitive material 1, which is disposed in the image recording apparatus corresponding to a position of a transport roller 53.

The main control portion 2 includes a CPU 21, a clock generating portion 22 and a control data memory 23 as an example of rate storing means. The CPU 21 controls the entire drawing processing of the image recording apparatus. The clock generating portion 22 generates various clocks according to instructions from the CPU 21 and outputs them respectively to corresponding circuit blocks. In this embodiment, characteristic clocks outputted by the clock generating portion 22 include first through third clocks. The first clock is outputted to first and second data rate detecting portions 32 and 35 to enable detection of transfer rates of image data transmitted on first and second interfaces 31 and 34. The second clock is outputted to a polygon driving motor driver 43 to rotate a polygon mirror 45 at the number of revolution determined in the CPU 21. The third clock is outputted to a roller driving motor driver 51 to rotate the transport roller 53 at the number of revolution determined in the CPU 21. The control data memory 23 stores a reading speed of a data storing portion 33 described later. The control data memory 23 is used when the CPU 21 controls the image recording speed to the photosensitive material 1 according to a manual operation by an operator.

The image data input portion 3 includes the first interface 31, the first data rate detecting portion 32 as an example of first data transfer rate detecting means, the data storing portion 33 as an example of data storing means, the second interface 34, the second data rate detecting portion 35 as an example of second data transfer rate detecting means, and a selector 36 as an example of route selecting means. The first interface 31 connects an external device not shown and the image recording apparatus. That is to say, the first interface 31 functions as an input port for image data transferred from the external device. The external device includes an image scanner for image reading to generate image data, a workstation for processing and outputting the image data generated in the image scanner, etc. On the basis of the instructions from the CPU 21, the first data rate detecting portion 32 detects a transfer rate of the image data on the first interface 31, i.e., a data output speed of the external device. In this embodiment, the first data rate detecting portion 32 samples transfer rate detection data transmitted from the external device in synchronization with the first clock, detects a data amount transmitted during one clock and sends the detected result to the CPU 21 as the data transfer rate. The transfer rate of the image data on the first interface 31 may be detected by another method.

The data storing portion 33 is a rewritable storage apparatus, such as a semiconductor memory, a hard disk drive (HDD), or a magnetic optical disk drive (MODD), which collectively stores image data for at least one page to dispense with intermittent output of the image data in the course of drawing. The data storing portion 33 in this embodiment has a switching function (refer to FIG. 2) to improve efficiencies of drawing processing. The second interface 34 connects the data storing portion 33 and a changeover switch 36B of the selector 36 disposed in the following stage. The data storing portion 33 and the second interface 34 are detachably mounted on the image recording apparatus. This allows various data storing portions 33, such as a memory, HDD, MODD, etc. to be mounted on the image recording apparatus. The second data rate detecting portion 35 detects the transfer rate of the image data on the second interface 34, i.e., the reading speed of the data storing portion 33 by the same method as that of the first data rate detecting portion 32.

The selector 36 includes two changeover switches 36A and 36B. The changeover switch 36A has three terminals a through c. The terminal a is coupled with the first interface 31. The terminal b is coupled with the terminal e of the changeover switch 36B subsequently described. The terminal c is detachably connected to an image data input end (not shown) of the data storing portion 33. The changeover switch 36B has four terminals d through g. The terminal d is coupled to a light source control portion 41 on the following stage. The terminal f is detachably connected to the second interface 34. The terminal g is grounded and used for initialization, subsequently described later.

In drawing, the selector 36 switches on the basis of the instructions from the CPU 21 whether the image data transmitted through the first interface 31 is to be outputted to the optical system 4 on the following stage after once buffered in the data storing portion 33, or to be outputted directly to the optical system 4. In the former case, the CPU 21 connects the terminal a and the terminal c of the changeover switch 36A and connects the terminal f and the terminal d of the changeover switch 36B. In the latter case, the CPU 21 connects the terminal a and the terminal b of the changeover switch 36A and connects the terminal e and the terminal d of the changeover switch 36B. At the time of initialization, the selector 36 connects the terminal a and the terminal c of the changeover switch 36A, connects the terminal f and the terminal g of the changeover switch 36B and puts the terminal d into an unconnected state.

The optical system 4 includes the light source control portion 41, a light source 42 as an example of an electric-photo converting device, a polygon driving motor driver 43, a polygon driving motor 44 as an example of first driving force generating means and a polygon mirror 45 as an example of a reflection device. The light source control portion 41 has an output dot waveform shaping portion 411 and an output level adjusting portion 412. The output dot waveform shaping portion 411 shapes a waveform of inputted image data. The output level adjusting portion 412 adjusts an output signal level of the image data to optimize a light level of a drawing light emitted by the light source 42 on the following stage. The light source 42 is formed of a gas laser, a laser diode, etc., which converts image data inputted from the light source control portion 41 into a drawing light which is a light signal and emits the drawing light to the polygon mirror 45 on the following stage.

The polygon driving motor driver 43 accommodates a PLL (Phase Lock Loop) circuit to control with high accuracy a rotational speed of the polygon mirror 45. The polygon driving motor 44 is composed of a servo motor with a rotary encoder, etc., the polygon mirror 45 is coupled to its rotation axis. Accordingly, the polygon mirror 45 rotates as the rotation axis of the polygon driving motor 44 rotates. The PLL circuit in the polygon driving motor driver 43 controls a rotation speed and a rotation phase of the polygon driving motor 44 so that a phase of a rotation speed detection signal fed back from the rotary encoder in the polygon driving motor 44 coincides with a phase of the second clock provided from the clock generating portion 22. Hence, the polygon driving motor 44 rotates at the rotation speed and phase defined by the second clock. The polygon mirror 45 has a regular polyhedral shape. When the polygon mirror 45 rotates, an angle of incidence of the drawing light always varies, and an angle of reflection also always varies accordingly. This allows a scan of the drawing light in the main scanning direction to the photosensitive material 1. The drawing light is reflected by the polygon mirror 45 in this embodiment, but a Galvanometer mirror may be used, for example. The Galvanometer mirror has a plane shape, which is displaced by an electromagnetic coil, etc. to reflect the drawing light. This enables a scan of the photosensitive material 1 with the drawing light in the main scanning direction.

The photosensitive material transport portion 5 includes a roller driving motor driver 51, a roller driving motor 52 as an example of second driving force generating means, and a transport roller 53 as an example of a sub-scanning feed mechanism. The roller driving motor driver 51 generates a driving signal on the basis of the third clock provided from the clock generating portion 22 and outputs the signal to the roller driving motor 52. The roller driving motor 52 is formed of a pulse motor, for example, which is driven by the driving signal provided from the roller driving motor driver 51. A rotation force of the roller driving motor 52 is transmitted to the transport roller 53. The transport roller 53 has two circular rollers arranged to abut, and the photosensitive material 1 is held therebetween. A rotation of the transport roller 53 allows the photosensitive material 1 to be conveyed in the sub-scanning direction (the arrow along the X direction).

The operation portion 6 includes an input portion 61 and a mode switch 62. The input portion 61 is formed of a look-up panel, a panel touch key, etc, which has such a structure as to enable an operator to send various instructions to the image recording apparatus. The mode switch 62 is a switch for switching to a manual mode (a mode for controlling the image recording speed according to instructions from the operator) and to an automatic mode (a mode in which the CPU 1 automatically controls the image recording speed.)

Figure 2:
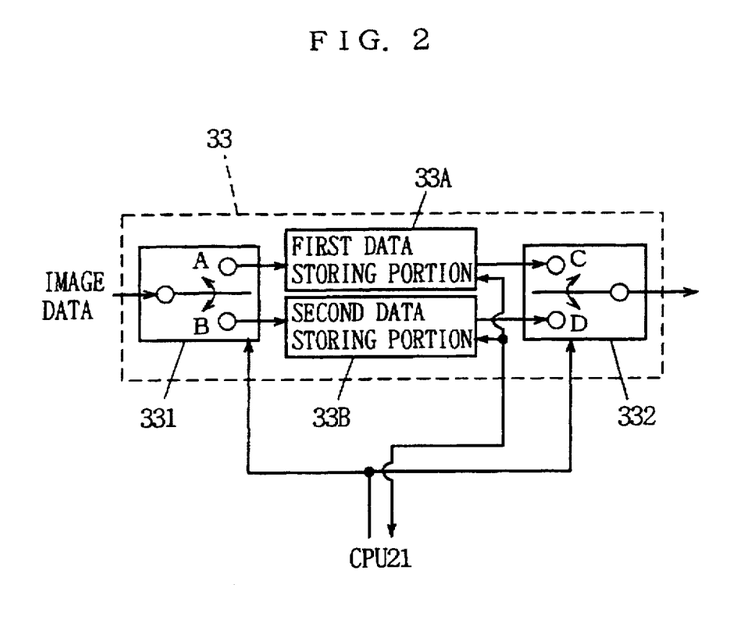
FIG. 2 is a block diagram showing a more detailed structure of the data storing portion 33 shown in FIG. 1.
Figure 3:
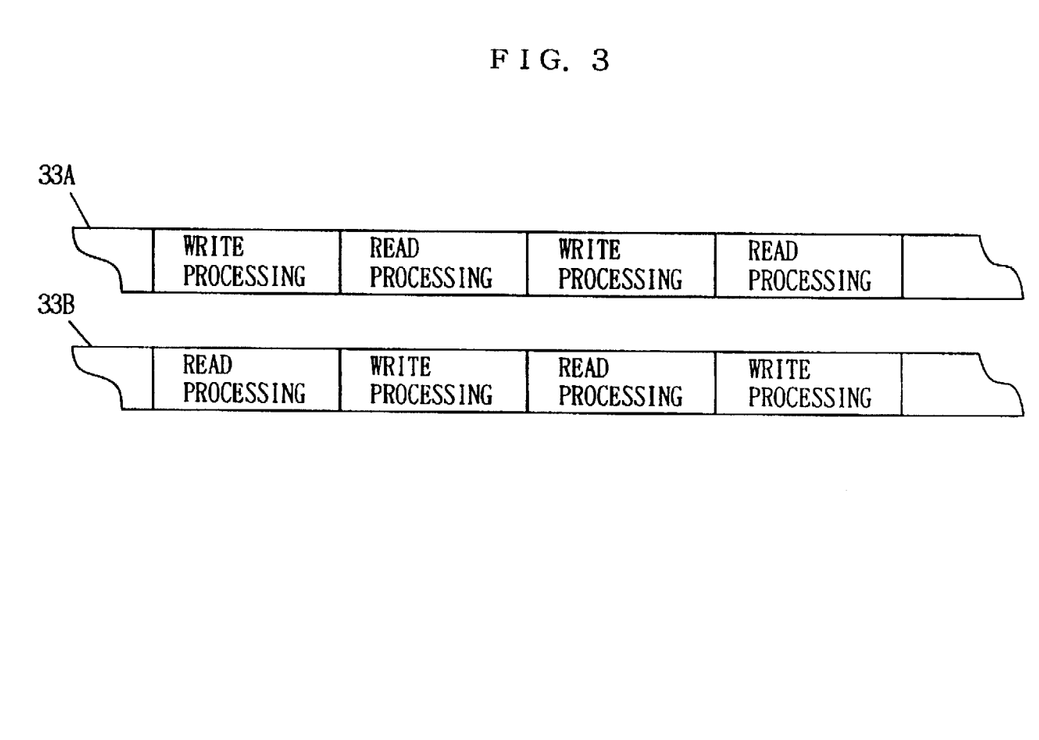
FIG. 3 is a reference diagram showing time sequential transition of processing conditions of the first data storing portion 33A and the second data storing portion 33B of the data storing portion 33 shown in FIG. 2.

FIG. 2 is a block diagram showing a more detailed structure of the data storing portion 33 shown in FIG. 1. In FIG. 2, the data storing portion 33 includes a first data storing portion 33A and a second data storing portion 33B as examples of a plurality of memories, a third changeover switch 331 and a fourth changeover switch 332. The first and second data storing portions 33A and 33B each have capacity for storing image data for at least one page, and alternately perform according to the instructions from the CPU 21 the processing of storing the inputted image data (hereinafter referred to as "writing processing") and the processing of outputting the stored image data (hereinafter referred to as "reading processing"). FIG. 3 is a diagram showing the time sequential transition of the writing/reading processing performed by the first and second data storing portions 33A and 33B. As shown in FIG. 3, the first and second data storing portions 33A and 33B perform a so-called switching operation for writing and reading of the image data, which never perform the same processing at the same time.

Upon receiving instructions from the CPU 21, the third changeover switch 331 is switched to determine whether the inputted image data is stored in the first data storing portion 33A or is stored in the second data storing portion 33B. That is to say, when the third changeover switch 331 is connected to the terminal A side, the image data is stored in the first data storing portion 33A, and when the third changeover switch 331 is connected to the terminal B side, the image data is stored in the second data storing portion 33B. Upon receiving the instructions from the CPU 21, the fourth changeover switch 332, in turn, is switched to decide whether the image data stored in the first data storing portion 33A is outputted, or the image data stored in the second data storing portion 33B is outputted. That is to say, when the fourth changeover switch 332 is connected to the terminal C side, the image data stored in the first data storing portion 33A is outputted, and when the fourth changeover switch 332 is connected to the terminal D side, the image data stored in the second data storing portion 33B is outputted.

The data storing portion 33 shown in FIG. 2 includes the first and second data storing portions 33A and 33B. The data storing portion 33 is, however, not limited to two data storing portions 33A and 33B, and may include three or more data storing portions. In such case, switching control of the third and fourth changeover switches 331 and 332 will be complicated. However, if an amount of image data read from either one of the data storing portions is large, a plurality of image data in a smaller amount can individually be write-processed respectively into other data storing portions continuously.

Figure 4:
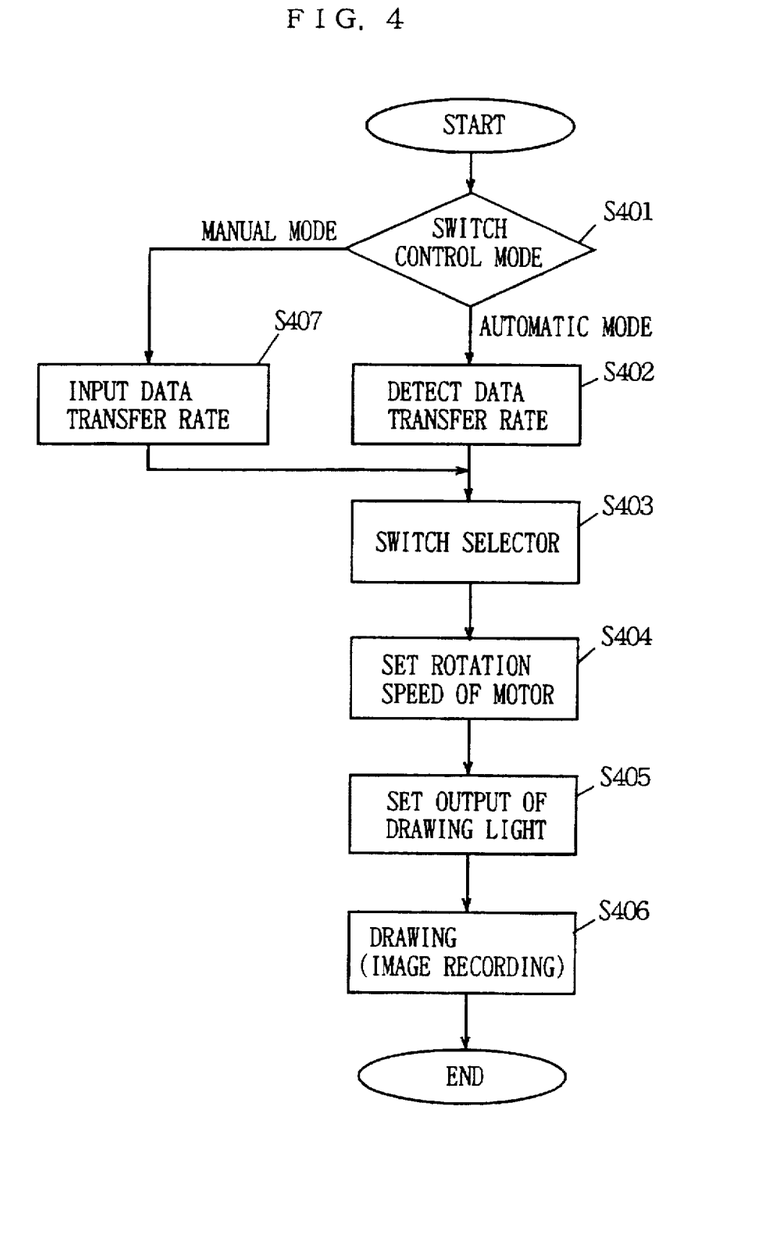
FIG. 4 is a flow chart showing the operation of the CPU 21 when the image recording apparatus draws an image on the photosensitive material.

FIG. 4 is a flow chart showing the operation related to the drawing processing in the image recording apparatus of this embodiment. Referring to FIG. 4, the characteristic operations of this embodiment is subsequently described in detail. The image recording apparatus of this embodiment performs initialization before drawing on the photosensitive material 1. First, the CPU 21 makes the input portion 61 display a message for inquiring size of the photosensitive material 1 and image recording density. In response, an operator operating the image recording apparatus operates the input portion 61 to input data indicating the size of the photosensitive material 1 and the image recording density. Next, the CPU 21 causes a message for selecting the manual mode or the automatic mode to be displayed in the look-up panel of the input portion 61. In response, the operator operates the mode switch 62 to select either the manual mode or the automatic mode (Step S401).

In the first instance, an explanation of operations will be given below where the operator selects the automatic mode. In this case, the CPU 21 first switches a connection state of the selector 36. That is to say, the CPU 21 connects the terminal a and the terminal c of the changeover switch 36A and connects the terminal f and the terminal g of the changeover switch 36B. Next, the CPU 21 outputs to the external device a request to send transfer rate detection data. The external device outputs the transfer rate detection data in response to the request to send. The outputted transfer rate detection data is stored in the data storing portion 33 through the first interface 31. The transfer rate detection data stored in the data storing portion 33 is sequentially read from the data storing portion 33 and grounded through the second interface 34. While the transfer rate detection data is outputted from the external device, the CPU 21 instructs the clock generating portion 22 to generate the first clock. The generated first clock is supplied to the first and second data rate detecting portions 32 and 35. The first and second data rate detecting portions 32 and 35 respectively detect the data amount transmitted during one clock of the first clock as has been described above, and send the detected results to the CPU 21 as the data transfer rates. In this way, the CPU 21 detects the data transfer rates in the first and second interfaces 31 and 34 (Step S402).

Next, the CPU 21 compares the data transfer rate in the first interface 31 and the data transfer rate in the second interface 34 and switches the connection state of the selector 36 on the basis of the result of the comparison (Step S403). That is to say, if the data transfer rate in the second interface 34 is faster, then the CPU 21 connects the terminal a and the terminal c of the changeover switch 36A and connects the terminal f and the terminal d of the changeover switch 36B. Then, the image data to be inputted from the external device in later drawing processing is once buffered in the data storing portion 33 and then supplied to the optical system 4.

On the other hand, if the data transfer rate in the first interface 31 is faster, then the CPU 21 connects the terminal a and the terminal b of the changeover switch 36A and connects the terminal e and the terminal d of the changeover switch 36B. Therefore, the image data to be inputted from the external device in later drawing processing is supplied directly to the optical system 4 without being buffered. This is because buffering the image data in the data storing portion would then decrease the transfer rate of the image data when the data transfer rate in the first interface 31 is higher than the data transfer rate in the second interface 34, i.e., when the data output speed of the external device is faster than the reading speed of the data storing portion 33.

Next, the CPU 21 calculates the most suitable rotation speed of the polygon mirror 45 on the basis of the data transfer rates detected by the first and second data rate detecting portions 32 and 35, and the size of the photosensitive material 1, and the drawing density inputted by the operator, and instructs the clock generating portion 22 to generate the second clock corresponding to the rotation speed. In response, the clock generating portion 22 generates the second clock and outputs the clock to the polygon driving motor driver 43. The polygon driving motor driver 43 causes the rotation speed of the polygon driving motor 44 accurately coincide with the rotation speed desired by the CPU 21 according to the principle described above. Next, the CPU 21 calculates the most suitable rotation speed of the roller driving motor 52 on the basis of the data transfer rates detected by the first and second data rate detecting portions 32 and 35 and the drawing density inputted by the operator, and instructs the clock generating portion 22 to generate the third clock corresponding to the rotation speed. In response, the clock generating portion 22 generates the third clock and outputs the clock to the roller driving motor driver 51. The roller driving motor driver 51 rotates the roller driving motor 52 on the basis of the third clock. In this way, the CPU 21 sets the rotation speeds of the polygon driving motor 44 and the roller driving motor 52 (Step S404).

After speed control of both motors has been completed the CPU 21 applies various settings to respective parts of the light source control portion 41 (Step S405). Then the light source control portion 41 finely adjusts the inputted image data to enable highly accurate drawing. Next, the CPU 21 starts the drawing process (Step S406). In the drawing process, the CPU 21 controls the switching operation of the data storing portion 33. The switching operation is subsequently described in detail referring to FIG. 3.

The external device transmits prescribed command data to the CPU 21 before transmitting the image data for each page. The command data at least includes information for starting transmission of the image data and the amount of information of the image data to be transmitted. Receiving the command data in the initial state, the CPU 21 unconditionally outputs a switch signal to the third changeover switch 331 and the fourth changeover switch 332. In response, the third changeover switch 331 and the fourth changeover switch 332 interlock to perform switching operations. For example, if the third changeover switch 331 switches to the terminal A side and the fourth changeover switch 332 switches to the terminal D side, then the first data storing portion 33A becomes writable and the second data storing portion 33B becomes readable.

When the image data is transmitted from the external device following the command data, the CPU 21 outputs a write address to the first data storing portion 33A and a read address to the second data storing portion 33B. Therefore, the first data storing portion 33A stores the image data transmitted from the external device in the address defined by the write address. On the other hand, the second data storing portion 33B reads the prestored image data of the preceding page according to the read address and outputs the data to the second interface 34. In the initial state, since no data is stored in the second data storing portion 33B, no data is read or outputted to the second interface 34. At this time, the CPU 21 counts the information amount of the image data stored in the first data storing portion 33A and monitors if the count value coincides with the information amount specified with the command data. The CPU 21 also monitors if reading of the image data from the second data storing portion 33B has finished or not.

Receiving the command data for the image data of the next page from the external device, under the conditions that it should be confirmed that the information amount of the image data stored in the first data storing portion 33A coincides with the information amount specified by the command data and that reading of the image data from the second data storing portion 33B has been finished, the CPU 21 outputs the switch signal again to the third changeover switch 331 and the fourth changeover switch 332. In response, the third changeover switch 331 and the fourth changeover switch 332 interlock to perform switching operations. For example, if the third changeover switch 331 switches to the terminal B side and the fourth changeover switch 332 switches to the terminal C side, then the first data storing portion 33A becomes readable and the second data storing portion 33B becomes writable. Subsequently, the CPU 21 repeats the operation described above to cause the first and second data storing portions 33A and 33B to perform switching operations.

Next, an explanation of operations will be given below where the manual mode is selected in Step S401. In this case, the CPU 21 causes the input portion 61 to display a message inquiring about a data output speed of the external device. In response, the operator operates the input portion 61 to enter data indicating the data output speed of the external device (Step S407). Next, the CPU 21 refers to the reading speed of the data storing portion 33 stored in the control data memory 23 to switch the selector 36 (Step S403). That is to say, if the data output speed of the external device is faster than the reading speed of the data storing portion 33, then the CPU 21 connects the terminal a and the terminal b of the changeover switch 36A and connects the terminal e and the terminal d of the changeover switch 36B. Then, the image data transmitted from the external device is outputted directly to the optical system 4 to prevent a decrease in the data transfer rate in the data storing portion 33. On the other hand, if the reading speed of the data storing portion 33 is faster than the data output speed of the external device, then the CPU 21 connects the terminal a and the terminal c of the changeover switch 36A and connects the terminal f and the terminal d of the changeover switch 36B. Then, the image data transmitted from the external device is once buffered in the data storing portion 33 and then outputted directly to the optical system 4, preventing intermittent feed in the middle of a page.

Next, the CPU 21 calculates the most suitable rotation speeds of the polygon mirror 45 and the roller driving motor 52 on the basis of the data output speed of the external device, the size of the photosensitive material 11 and the drawing density inputted by the operator, and the reading speed of the data storing portion 33 retrieved from the control data memory 23, and sets the rotation speeds of the polygon driving motor 44 and the roller driving motor 52 (Step S404). The following operations (Steps S405 and S406) are the same as those in the above-described automatic mode.

While the invention has been described in detail, the foregoing description is in all aspects illustrative and not restrictive. It is understood that numerous other modifications and variations can be devised without departing from the scope of the invention.

What is claimed is:

1. An image recording apparatus for scanning a photosensitive recording medium with a light beam to record an image on the recording medium, comprising:

an electric-photo converting device converting inputted image data into a modulated light beam;

a reflection device reflecting said light beam;

first driving force generating means generating a driving force to displace said reflection device to change an angle of incidence of said light beam thereby to scan said recording medium with said light beam in a main scanning direction;

a sub-scanning feed mechanism moving a main scanning position on said recording medium in a sub-scanning direction;

second driving force generating means generating a driving force to drive said sub-scanning feed mechanism;

rate detecting means for detecting an input rate of the image data into the electric-photo converting device by monitoring the image data inputted into said electric-photo converting device; and control means for determining an image recording speed onto said recording medium on the basis of the input rate detected by said rate detecting means and controlling the driving forces generated by said first and second driving force generating means according to the determined image recording speed.

2. The image recording apparatus according to claim 1, further comprising data storing means for temporarily storing said inputted image data; and rate determining means for determining a transfer rate of the image data by monitoring a transfer state of the image data from said data storing means to said electric-photo converting device;

wherein said control means determines image the recording rate onto said recording medium on the basis of the transfer rate of the image data from said data storing means to said electric-photo converting device determined by said transfer rate determining means and respectively controls the driving forces generated by said first and second driving force generating means according to the determined image storing rate.

3. The image recording apparatus according to claim 2, wherein said data storing means collectively stores said image data corresponding to at least one page of said recording medium.

4. The image recording apparatus according to claim 3, wherein said data storing means has a plurality of memories, and if any one of the memories is outputting image data and there is additional image data to be inputted, the additional image data is inputted into one of the other memories.

5. The image recording apparatus according to claim 4, wherein said data storing means is detachable to the image recording apparatus.

6. The image recording apparatus according to claim 5, further comprising route selecting means for disable and disabling the image data stored in said data storing means;

said control means includes input operation means for inputting a first transfer rate of the image data to said data storing means by a manual operation, and rate storing means for storing a second transfer rate of the image data from said data storing means to said electric-photo converting device; and said control means compares the first transfer rate inputted with said input operation means and the second transfer rate stored in said rate storing means, and disables said route selecting means to store said image data into said data storing means when the first transfer rate is higher, and enables said route selecting means to store said image data in said data storing means when the second transfer rate is higher.

7. The image recording apparatus according to claim 5, further comprising route selecting means for disable and disabling the image data stored in said data storing means, first data transfer rate detecting means for detecting a transfer rate of the image data to said data storing means, and second data transfer rate detecting means for detecting a transfer rate of the image data from said data storing means to said electric-photo converting device, wherein said control means determines whether to store image data in said data storing means on the basis of the data transfer rates detected by said first and second data transfer rate detecting means and sets said route selecting means.

8. The image recording apparatus according to claim 2, wherein said data storing means has a plurality of memories, and if any one of the memories is outputting the image data and additional image data to be inputted exists, the additional image data is inputted into one of the other memories.

9. The image recording apparatus according to claim 8, wherein said data storing means is detachable to the image recording apparatus.

10. The image recording apparatus according to claim 9, further comprising route selecting means adapted to enable and disable the image data to be stored in said data storing means;

said control means for includes input operation means inputting a first transfer rate of the image data to said data storing means by a manual operation, and rate storing means for storing a second transfer rate of the image data from said data storing means to said electric-photo converting device; and said control means compares the first transfer rate inputted with said input operation means and the second transfer rate stored in said rate storing means, and disables said route selecting means to store said image data into said data storing means when the first transfer rate is higher, and enables said route selecting means to store said image data in said data storing means when the second transfer rate is higher.

11. The image recording apparatus according to claim 9, further comprising route selecting means for disable and disabling the image data stored in said data storing means, first data transfer rate detecting means for detecting a transfer rate of the image data to said data storing means, and second data transfer rate detecting means for detecting a transfer rate of the image data from said data storing means to said electric-photo converting device, wherein said control means determines whether to store image data in said data storing means on the basis of the data transfer rates detected by said first and second data transfer rate detecting means and sets said route selecting means.

12. The image recording apparatus according to claim 2, wherein said data storing means is detachable to the image recording apparatus.

13. The image recording apparatus according to claim 12, further comprising route selecting means for disable and disabling the image data is stored in said data storing means;

said control means for includes input operation means inputting a first transfer rate of the image data to said data storing means by a manual operation, and rate storing means for storing a second transfer rate of the image data from said data storing means to said electric-photo converting device; and said control means compares the first transfer rate inputted with said input operation means and the second transfer rate stored in said rate storing means, and disables said route selecting means to store said image data into said data storing means when the first transfer rate is higher, and enables said route selecting means to store said image data in said data storing means when the second transfer rate is higher.

14. The image recording apparatus according to claim 12, further comprising route selecting means for disable and disabling the image data stored in said data storing means, first data transfer rate detecting means for detecting a transfer rate of the image data to said data storing means, and second data transfer rate detecting means for detecting a transfer rate of the image data from said data storing means to said electric-photo converting device, wherein said control means determines whether to store image data in said data storing means on the basis of the data transfer rates detected by said first and second data transfer rate detecting means and sets said route selecting means.

15. The image recording apparatus according to claim 2, further comprising route selecting means for disable and disabling the image data stored in said data storing means;

said control means for includes input operation means inputting a first transfer rate of the image data to said data storing means by a manual operation, and rate storing means for storing a second transfer rate of the image data from said data storing means to said electric-photo converting device; and said control means compares the first transfer rate inputted with said input operation means and the second transfer rate stored in said rate storing means, and disables said route selecting means to store said image data into said data storing means when the first transfer rate is higher, and enables said route selecting means to store said image data in said data storing means when the second transfer rate is higher.

16. The image recording apparatus according to claim 2, further comprising route selecting means for disable and disabling the image data stored in said data storing means, first data transfer rate detecting means for detecting a transfer rate of the image data to said data storing means, and second data transfer rate detecting means for detecting a transfer rate of the image data from said data storing means to said electric-photo converting device, wherein said control means determines whether to store image data in said data storing means on the basis of the data transfer rates detected by said first and second data transfer rate detecting means and sets said route selecting means.

17. An image recording apparatus for scanning a photosensitive recording medium with a light beam to record an image on the recording medium comprising:

an electric-photo converting means for converting inputted image data into a modulated light beam;

a reflecting means for reflecting said light beam;

first driving force generating means for generating a driving force to displace said reflecting means to change an angle of incidence of said light beam thereby to scan said recording medium with said light beam in a main scanning direction;

a sub-scanning feeding means for moving a main scanning position on said recording medium in a sub-scanning direction;

second driving force generating means for generating a driving force to drive said sub-scanning feed mechanism;

rate detecting means for detecting an input rate of the image data into the electric-photo converting means by monitoring the image data inputted into said electric-photo converting means; and control means for determining an image recording speed onto said recording medium on the basis of an input rate detected by said rate detecting means and for controlling the driving forces generated by said first and second driving force generating means according to the determined image recording speed.

18. An image recording apparatus for scanning a photosensitive recording medium with a light beam to record an image on the recording medium, comprising:

an electric-photo converting device converting inputted image data into a modulated light beam;

a reflection device reflecting said light beam;

first driving motor generating a driving force for displacing said reflection device to change an angle of incidence of said light beam thereby to scan said recording medium with said light beam in a main scanning direction;

a sub-scanning feed mechanism moving a main scanning position on said recording medium in a sub-scanning direction;

a second driving motor to generate a driving force for driving said sub-scanning feed mechanism;

a rate detecting device detecting an input rate of the image data into the electric-photo converting device by monitoring the image data inputted into said electric-photo converting device; and a controller determining an image recording speed onto said recording medium on the basis of the input rate detected by said rate detecting device and said controller controlling the driving forces generated by said first and second driving motors according to the determined image recording speed.

19. The image recording apparatus according to claim 18, further comprising a data storing unit for temporarily storing said image data inputted from external the image recording apparatus; and a rate determining device determining a transfer rate of the image data by monitoring a transfer state of the image data from said data storing unit to said electric-photo converting device;

wherein said controller determine, image the recording rate onto said recording medium on the basis of the transfer rate of the image data from said data storing unit to said electric-photo converting device determined by said transfer rate determining device and respectively controls the driving forces generated by said first and second driving motors according to the determined image storing rate.

20. The image recording apparatus according to claim 19, wherein said data storing unit collectively stores said image data corresponding to at least one page of said recording medium.

21. The image recording apparatus according to claim 20, wherein said data storing unit has a plurality of memories, and if any one of the memories is outputting image data and there is additional image data to be inputted, the additional image data is inputted into one of the other memories.

22. The image recording apparatus according to claim 21, further comprising route selecting device adapted to enable and disable the image data stored in said data memory;

said controller includes input operation device inputting a first transfer rate of the image data to said data storing unit by a manual operation, and control data memory to store a second transfer rate of the image data from said data storing unit to said electric-photo converting device; and said controller compares the first transfer rate inputted with said input operation device and the second transfer rate stored in said control data memory, and disables said route selecting device to store said image data into said data storing device when the first transfer rate is higher, and enables said route selecting device to store said image data in said storing unit when the second transfer rate is higher.

23. The image recording apparatus according to claim 21, further comprising route selecting device adapted to enable and disable the image data stored in said data storing unit;

first data transfer rate detecting unit detecting a transfer rate of the image data from the outside to said data storing unit, and second data transfer rate detecting unit detecting a transfer rate of the image date from said data storing unit to said electric-photo converting device, wherein said controller determines whether to store image data in said data storing device on the basis of the data transfer rates detected by said first and second data transfer rate detecting units and sets said route selecting device.

24. The image recording apparatus according to claim 18, wherein said reflection device is a polygon mirror, and said first driving motor is a polygon driving motor.

25. The image recording apparatus according to claim 18, wherein said sub-scanning feed mechanism are transport rollers, and said second driving motor is a roller driving motor.

* * * * *